United States Patent
Miller et al.

(10) Patent No.: US 11,021,956 B1
(45) Date of Patent: Jun. 1, 2021

(54) MINE SAFETY DUST AND METHOD OF PRODUCTION

(71) Applicant: E. Dillon & Company, Swords Creek, VA (US)

(72) Inventors: Mike Miller, Honaker, VA (US); Thomas Harmon Harris, Rosedale, VA (US)

(73) Assignee: E. DILLON & COMPANY, Swords Creek, VA (US)

(*) Notice: Subject to any disclaimer, the term of this patent is extended or adjusted under 35 U.S.C. 154(b) by 201 days.

(21) Appl. No.: 16/456,710

(22) Filed: Jun. 28, 2019

Related U.S. Application Data

(60) Provisional application No. 62/692,317, filed on Jun. 29, 2018.

(51) Int. Cl.
*E21F 5/12* (2006.01)
*C09K 3/22* (2006.01)

(52) U.S. Cl.
CPC . *E21F 5/12* (2013.01); *C09K 3/22* (2013.01)

(58) Field of Classification Search
None
See application file for complete search history.

(56) References Cited

U.S. PATENT DOCUMENTS

| | | | | |
|---|---|---|---|---|
| 2,705,185 A * | 3/1955 | Kamlet | ...................... | C01F 5/30 423/163 |
| 3,595,317 A | 7/1971 | Bell | | |
| 3,752,079 A * | 8/1973 | Lewer | ...................... | E21F 5/16 102/333 |
| 4,038,443 A | 7/1977 | Jacoby | | |
| 4,417,992 A | 11/1983 | Bhattacharyya | | |
| 7,157,021 B2 * | 1/2007 | Bytnar | ...................... | C09K 3/22 106/162.1 |
| 7,959,436 B2 | 6/2011 | Gavenda et al. | | |
| 9,228,435 B2 | 1/2016 | VanBuren | | |
| 9,458,718 B2 | 10/2016 | Wright | | |
| 9,631,492 B2 | 4/2017 | Anstine et al. | | |
| 1,029,411 A1 | 5/2019 | Gerard et al. | | |
| 2004/0195545 A1 | 10/2004 | Gay et al. | | |
| 2010/0294725 A1 * | 11/2010 | Bush | ...................... | C02F 1/5272 210/702 |
| 2011/0049417 A1 * | 3/2011 | Swift | ...................... | C10L 5/24 252/88.1 |
| 2012/0111583 A1 | 5/2012 | Brown et al. | | |
| 2012/0181051 A1 * | 7/2012 | Masloff | ...................... | C08J 9/0066 169/46 |
| 2012/0256020 A1 * | 10/2012 | Masloff | ...................... | E21F 5/10 239/654 |
| 2014/0034871 A1 * | 2/2014 | Swift | ...................... | C09K 3/22 252/88.1 |
| 2015/0037496 A1 | 2/2015 | Wicks et al. | | |
| 2019/0300634 A1 * | 10/2019 | Clear | ...................... | C09K 3/22 |

\* cited by examiner

*Primary Examiner* — Joseph D Anthony

(57) ABSTRACT

A mine safety dust exhibiting improved dispersion in water. The rock dust includes dolomitic limestone particles which, when mixed at the mine site to form a slurry, stay in suspension during intermittent operation of spray machinery and with a reduced need for continuous mixing. The rock dust composition includes an inorganic salt that acts as a dispersant to improve dispersion of the rock dust in water and further acts as a deflocculant to keep the dust particles in suspension in the resultant slurry.

9 Claims, 2 Drawing Sheets

MINE SAFETY DUST AND METHOD OF PRODUCTION

CROSS-REFERENCE TO RELATED APPLICATIONS

This application claims the priority of Provisional U.S. Patent Application Ser. No. 62/692,317 filed Jun. 29, 2018.

FIELD OF THE INVENTION

This invention is directed toward materials for minimizing the possibility of explosions in mines, and more specifically to a composition that disperses easily in water to form rock dust slurry for coating the surfaces of the mine.

BACKGROUND

Mine safety dust, also known as rock dust, is used in underground coal mines and the like to change the ratio between explosive coal dust and inert material present in the mine. By treating the surfaces in a mine with rock dust, more noncombustible material is placed on the walls, floors, and ceilings than there is coal dust and thus minimizes the risk to mine personnel.

In treating the mine surfaces, a mine dust slurry is typically prepared at the mine site by mixing dry, finely ground sedimentary or metamorphic rock particles with water. The mine dust slurry is then applied to the mine floor, mine walls and similar surfaces by a wet-spray machine.

Although the dry rock dust and water are mixed initially, there is a tendency for the rock particles to fall out of dispersion as there is typically no attempt to provide continuous mixing or agitation of the slurry. Furthermore, spraying of the mine dust slurry is typically done intermittently, with the operators starting and stopping as dictated by the mine operations. The lack of continuous mixing and the stop and go nature of the wet spray operation typically cause the rock particles to fall out of suspension.

Accordingly, there is a need for a dry rock dust material for mixing with water to form a mine dust slurry in which the rock particles stay in suspension during intermittent starting and stopping of the wet spray machine and without the need for continuous mixing.

BRIEF SUMMARY OF THE INVENTION

A mine safety dust exhibiting improved dispersion in water. The rock dust includes dolomitic limestone particles which, when mixed at the mine site to form a slurry, stay in suspension during intermittent operation of spray machinery and with a reduced need for continuous mixing. The rock dust composition includes an inorganic salt that acts as a dispersant to improve dispersion of the rock dust in water and further acts as a deflocculant to keep the dust particles in suspension in the resultant slurry.

According to some embodiments, there is further disclosed a method for preparation and packaging of the rock dust. Dolomitic limestone having a high magnesium content is pulverized, sieved, and treated with a deflocculant to form a dry rock dust material which may be packaged and shipped to a mine site. At the mine site, the dry rock dust can be easily mixed with water, without further additives at the mine site, to form a mine safety dust slurry in which the rock particles stay in suspension with reduced settling of particles and less need for continuous mixing.

EXEMPLARY ADVANTAGES

The deflocculent-treated rock dust disperses easily in water and the rock particles stay in suspension with reduced settling of particles and less need for continuous mixing.

When formed into a slurry, the rock dust particles stay in suspension during intermittent operation of spray machinery and with a reduced need for continuous mixing.

A method of production includes pulverizing and sieving dolomitic limestone and treating the pulverized and classified material with a deflocculant to form a dry rock dust material which may be packaged and shipped to a mine site where it can be mixed with water to form a slurry that may be applied to surfaces of the mine.

These and other objects and advantages of the invention will be obvious in view of the following description and with reference to the accompanying drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

In accordance with the embodiment shown herein, the invention is a novel mine safety dust and a method for its production.

Figure 1:
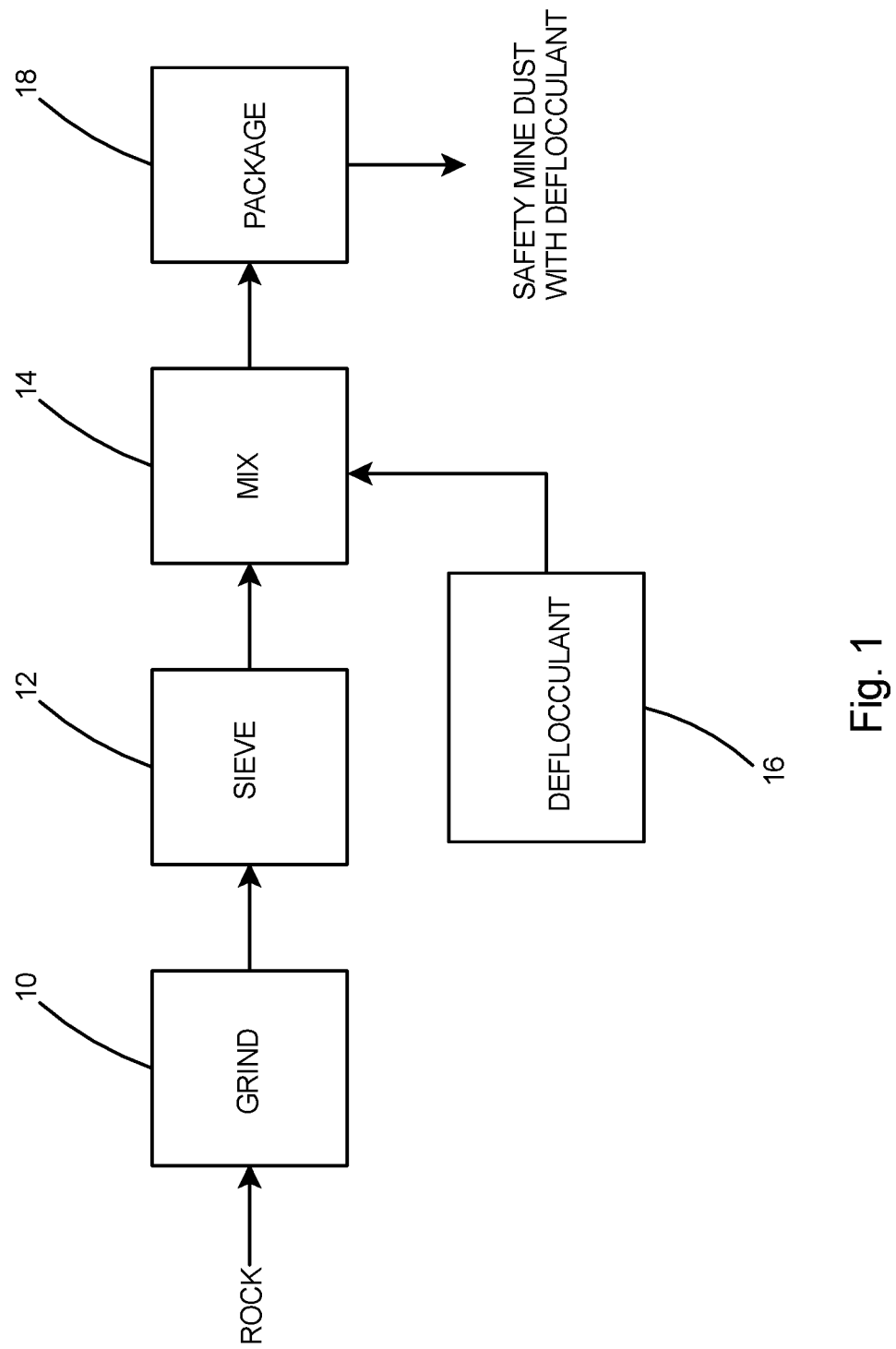
FIG. 1 is a flowchart depicting a method of production of mine safety dust according to the invention.

Referring to FIG. 1, the method of production of a mine safety dust according to the invention includes the grinding 10 of a sedimentary or metamorphic rock material. The particles exiting the grinding step are then sieved and classified 12 to ensure the particles do not exceed a specified size. Deflocculant 16 is then added in a mixing step 14 to disperse the deflocculant evenly in the particles. The rock particle and deflocculant product then proceeds through a packaging step 18, which packaging may consist of, as an example discreet bags of safety mine dust including deflocculant mixed evenly within the rock particles.

A mine safety dust according to the invention can be produced of any sedimentary or metamorphic rock that is ground or pulverized to a desired particle size. Preferably the rock is limestone or marble. Most preferably the input rock material is dolomitic limestone. Dolomitic limestone is a sedimentary carbonate rock composed mainly of the mineral dolomite, wherein dolomite as used herein is defined as an anhydrous carbonate mineral composed of calcium magnesium carbonate with the formula $CaMg(CO_3)_2$.

Preferably the dolomitic limestone is ground or pulverized to a size such that 100 percent of the sieved material will pass through a sieve having 20 meshes per inch and 70 to 80 percent of which will pass through a sieve having 200 meshes per inch. The pulverizing step is adjusted to maintain the sieved product within this specification. The mineral particles of the resultant pulverized dolomitic limestone are of a desired round shape whereas particles of non-dolomitic limestone include a substantially flat profile.

Deflocculant 16 is added to the pulverized rock material and mixed in the mixing step 14 until the deflocculant is evenly dispersed within the pulverized rock material. The resultant product exiting the mixing step is a pulverized dolomitic limestone with the deflocculant dispersed evenly therein.

A preferred deflocculant according to the invention is sodium chloride (NaCl). The NaCl is preferably added to maintain a concentration of from 3.6 to 3.8 grams NaCl per pound of pulverized dolomitic limestone, which averages about 0.80 percent by weight in the final product.

The resultant mine safety dust consisting of pulverized dolomitic limestone with 3.6 to 3.8 grams NaCl deflocculant per pound of pulverized dolomitic limestone, when mixed with water and agitated in the convention manner to form a slurry of mine dust, forms an enhanced mine dust slurry in which the mineral particles are maintained in a properly dispersed state for a longer period of time than slurries prepared from conventional mine safety dust. The salt also makes the slurry cake better when it dries.

TABLE 1

Mine Dust Comparison:

| Element | Sample A (wt %) | Sample B (wt %) | E. Dillon (wt %) |
|---|---|---|---|
| CaO | 55.49 | 43.79 | 30.24 |
| $Fe_2O_3$ | 0.27 | 0.20 | 0.18 |
| $SiO_2$ | 2.06 | 2.08 | 1.45 |
| $Al_2O_3$ | 0.55 | 0.67 | 0.33 |
| MgO | 2.02 | 4.91 | 20.81 |
| S | 0.20 | 0.33 | 0.12 |
| NaCl | 0.00 | 0.00 | 0.80 |
| Density-rodded/loose | 76.5/72 lbs/ft$^3$ | — | 83.1/73.8 lbs/ft$^3$ |

Table 1 above lists the results of a chemical analysis of mine dust from three suppliers, including samples from two suppliers of mine dust (samples A and B) and from a sample of E. Dillon's mine dust. A mine dust according to the invention included 0.80 percent by weight of NaCl, as compared to 0 percent in samples A and B. The E. Dillon mine dust is a pulverized dolomite with a high magnesium content. The meaning of the term "high magnesium content" as used herein means a magnesium content of at least 10%. Dolomite is an anhydrous carbonate mineral composed of calcium magnesium carbonate, usually of the general chemical formula $CaMg(CO_3)_2$. However, various deposits of dolomite on the earth's surface vary greatly in ratio of carbon to magnesium in the deposit. The E. Dillon dolomite is substantially high in magnesium content. As shown in Table 1, the E. Dillon mine dust is about 21% magnesium oxide versus about 2 to 5% magnesium in the comparative samples. The rodded and loose density of Sample A was determined and compared with the E. Dillon mine dust in accordance with ASTM C29. As shown in the last row of Table 1, the density of the E. Dillon mine dust was higher than the Sample A product, which can be attributed to the much higher ratio of magnesium to carbon in the E. Dillon dolomite versus the Sample A product. The rodded density per ASTM C29 is preferably between 78 and 90 lbs/ft$^3$ in a mine dust according to the invention. More preferably the rodded density of the mine safety dust is between 80 and 88 lbs/ft$^3$ per ASTM C29. Most preferably the rodded density of the mine safety dust is between 81 and 86 lbs/ft$^3$ ASTM C29.

More specifically, the invention describes a method for forming a mine dust that disperses easily in water and has a reduced tendency for agglomeration of particles in the resultant mix, which includes the steps of:

(a) pulverizing dolomite having a high magnesium content;
(b) sieving the dolomite to produce a mine safety dust wherein 70% or more of the particles are of 75 microns or smaller; and
(c) injecting into the mine safety dust between 3.6 and 3.8 grams of sodium chloride (NaCl) per pound of dolomite to enhance the dispersion of the mine dust in water; and
(d) packaging the product into containers for shipment to mines.

The amount of NaCl added to the mine safety dust is preferably at least 2.0 grams of sodium chloride (NaCl) per pound of pulverized dolomite. More preferably the NaCl is added at a rate of between 2.0 and 8.0 grams of NaCl per pound of dolomite. Most preferably the NaCl is added at a rate of between 3.6 and 3.8 grams of NaCl per pound of pulverized dolomite, which is equivalent to 0.79 to 0.84 wt % NaCl in the pulverized dolomite. Preferably, the dolomite includes a magnesium content of at least 10%. More preferably, the dolomite includes a magnesium content of between 12 and 35%. Most preferably, the dolomite includes a magnesium content of between 15 and 30%.

With reference to FIG. 1, after the deflocculant is properly dispersed by the mixing step 14, it is packaged 18. Preferably the mine safety dust and deflocculant mixture is packaged in a bag filling machine, although other packaging means, such as trucks and railcars, are within the scope of the invention. Most preferably, 50 pound bags are filled, although other sizes of packaged material are within the scope of the invention. The current method of production is capable of producing dust/deflocculant mixture at a rate of 8.3 pounds per second, which is equivalent to filling a 50 pound bag every 6 seconds. Other types of packaging the dust/deflocculant mixture are also within the scope of the invention, such as shipping containers or trucks, although the packaging/shipping devices must be of the type to keep the dust/deflocculant mixture dry during shipment and storage.

Figure 2:
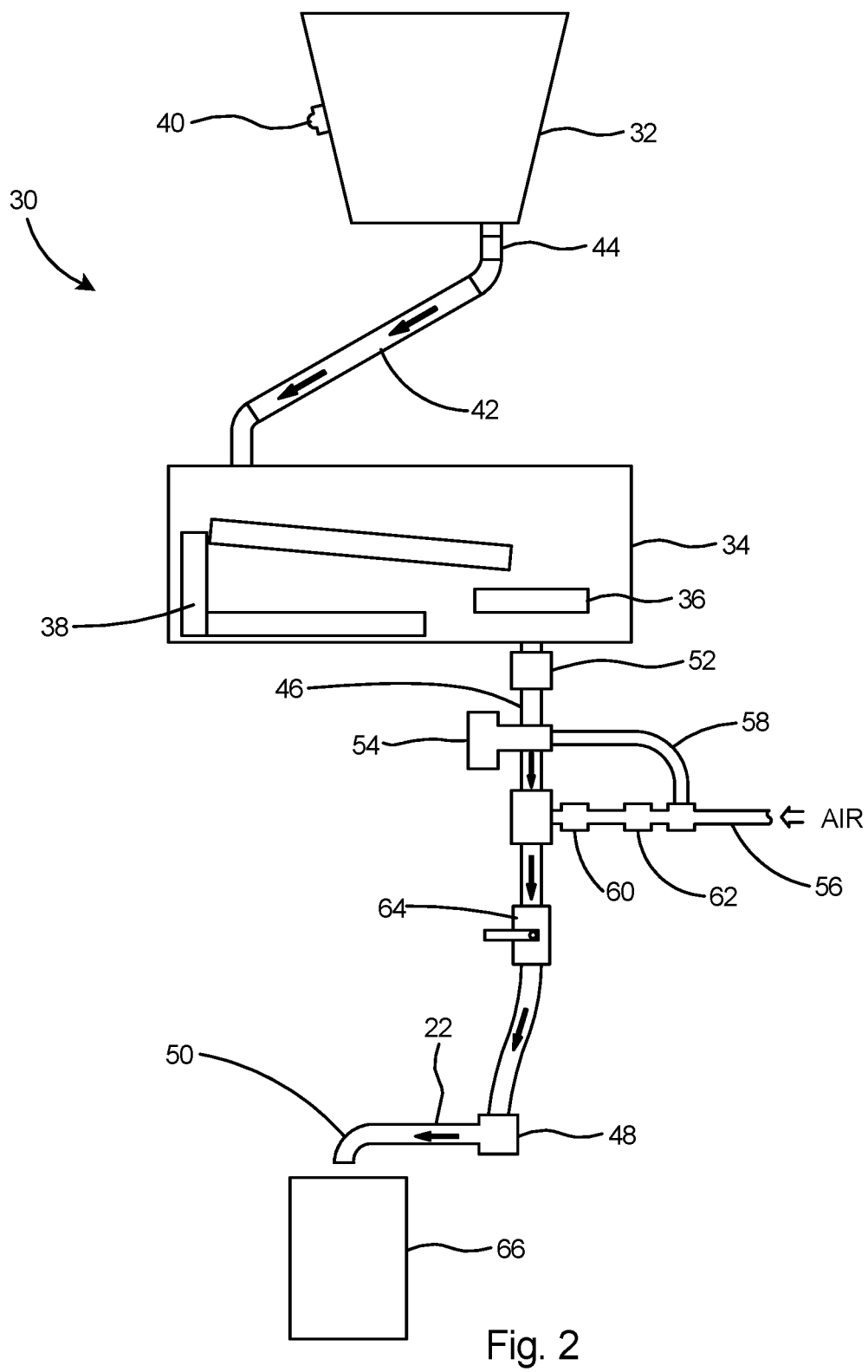
FIG. 2 is a schematic depicting a salt-injection flow system for producing a deflocculent-treated rock dust according to the invention.

With reference to FIG. 2, there is shown a procedure for filling a package with a salt-injected mine dust according to the invention. The salt-injection flow system 30 according to the invention includes a material bin 32, an enclosed box 34 including a material catch pan 36, and a vibrating feeder 38. An air vibrator 40 is included on the bin 32. A transport line 42 extends between the bin 32 and the enclosed box 34. A valve 44 is provided in the transport line 42 at the outlet of the bin 32. A second transport line 46 extends from the material catch pan 36 to a packer spout 48 with an injection tube 50. The second transport line 46 includes a clear container 52 and an air valve 54. A main air line 56 includes a line 58 to the air valve 54 and also supplies an electric air valve 60. A manual valve 62 can be used for closing off air flow to the electrical air valve 60. A manual valve 64 is also provided on the second transport line 46 on the downstream side of the air valve 54. Injection tube 50 leads to a packaging container 66.

Referring to FIG. 2, the method for injecting a measured amount of defloccuent into the pulverized dolomitic limestone includes:

(1) filling the material bin 32 with salt;
(2) turning the air vibrator 40 on to begin material flow;
(3) cutting the 1½ inch ball valve item 3 on to purge the system allowing material to flow to the material catch pan 36;
(4) install an container on the packer spout 48 engaging a micro-switch to start the flow of material;

(5) engaging an electrical relay to allow material to flow into the material catch pan 36 and gravity feed into the clear container 52;

(6) opening air valve 54 admitting air to push material through the injection tube to the packer spout 48 and into the packaging container 66;

(7) sensing the total weight of the packaging container 66 as it is filled;

(8) stopping the flow of material to the packaging container 66 when the proper weight has been reached; and (9) repeating steps (1) through (8) for additional packaging containers.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A mine safety dust comprising a composition of:
   pulverized dolomite having a particle size wherein 70% or more of the particles pass through a 200 mesh screen; and
   at least 2.0 grams of sodium chloride (NaCl) per pound of pulverized dolomite.

2. The mine safety dust of claim 1, comprising from 2.0 to 8.0 grams of NaCl per pound of pulverized dolomite.

3. The mine safety dust of claim 1, comprising 0.79 to 0.84 wt % NaCl in the pulverized dolomite.

4. The mine safety dust of claim 1 wherein the dolomite includes a magnesium content of at least 10% by weight.

5. The mine safety dust of claim 1, comprising a rodded density of between 78 and 90 lbs/ft3 per ASTM C29.

6. A method for forming a mine safety dust including:
   pulverizing dolomite to reduce the particle size;
   sieving the resultant particles through a 20 mesh sieve;
   sieving the resultant particles through a 200 mesh sieve;
   adjusting the pulverizing step until 70% or more of the particles pass through the 200 mesh sieve; and
   injecting into the pulverized and sieved material at least 2.0 grams of sodium chloride (NaCl) per pound of pulverized dolomite to enhance the dispersion of the mine dust in water.

7. The method of claim 6, wherein the NaCl comprises 0.79 to 0.84 wt % NaCl in the pulverized dolomite.

8. The method of claim 6, wherein the dolomite includes a magnesium content of at least 10% by weight.

9. The method of claim 6, wherein the dolomite comprises a rodded density of between 78 and 90 lbs/ft3 per ASTM C29.

* * * * *